Patented Aug. 5, 1947

2,425,175

UNITED STATES PATENT OFFICE 2,425,175

PROCESS FOR BREAKING PETROLEUM EMULSIONS

Paul G. Carpenter, Wilmington, Del., assignor to Hercules Powder Company, Wilmington, Del., a corporation of Delaware No Drawing. Application November 23, 1945, Serial No. 630,543

4 Claims. (Cl. 252—344)

This invention relates to a process for resolving petroleum emulsions and more particularly to the process of demulsification of petroleum emulsions of the water-in-oil type by treatment with an aminated chlorinated paraffin.

One of the serious problems in the oil industry is the stable emulsion of oil and water produced in the pumping of oil from the oil wells. It is customary to introduce a chemical agent into the pipe line, or elsewhere in the system, which will resolve the emulsion, thus enabling the separation of the oil from the water and the water-soluble impurities. Obviously, for such an agent to be of practical value it must be effective in very small amounts and must give a clean-cut separation. In addition, such an agent must be stable to the extremes of heat and cold encountered in the field, it must be adaptable for use in a chemical proportioning pump, and it must not cake or precipitate a sludge which would foul the chemical pump.

Various types of surface-active agents have been suggested for the demulsification of petroleum emulsions. However, one of the peculiarities of these emulsions is that one agent which may be very effective on an emulsion from one field will have little or no effect on an emulsion from another oil field. Among the surface-active agents of the prior art which have been suggested for this purpose are various aliphatic amines. These are, however, very limited in their application since they are ineffective or of no practical value for the demulsification of emulsions from many oil fields.

Now in accordance with this invention it has been found that petroleum emulsions of the water-in-oil type may be resolved by treatment with an aminated chlorinated paraffin. These aminated chlorinated paraffins show very superior properties for breaking petroleum emulsions over the aliphatic amines of the prior art, being effective on many emulsions which could not be broken efficiently by the prior art aliphatic amines.

The following examples are illustrative of the new process for breaking petroleum emulsions in accordance with this invention.

Example I

A water-in-oil emulsion freshly caught from a producing well contained 20% free water and 10% bottom settlings as determined by centrifuging. This emulsion was treated with the hydrochloride salt of an aminated chlorinated paraffin which contained 5.3% nitrogen and 9.9% chlorine. A ratio of eight pounds of the aminated chlorinated paraffin to 1,425 barrels of emulsion was used for the treatment and the water was allowed to separate. A clean-cut break was obtained and a sample of the supernatant oil when centrifuged showed less than 0.2% bottom settlings.

Example II

The above example was repeated except that the acetate salt of the same aminated chlorinated paraffin was used. Equivalent results were obtained with this compound.

Example III

A water-in-oil emulsion freshly caught from a producing well contained 35% bottom settlings and 4% free water. This emulsion was treated with an aminated chlorinated paraffin containing 5.8% nitrogen and 7.1% chlorine, at a ratio of eight pounds of the chemical to 950 barrels of emulsion. The oil and water were allowed to separate and a sample of the supernatant oil when centrifuged showed less than 0.2% bottom settlings.

Example IV

A water-in-oil emulsion taken directly from a producing well contained 20% bottom settlings and 20% free water. This emulsion was treated with an aminated chlorinated paraffin containing 6.0% nitrogen and 5.8% chlorine in the ratio of eight pounds of the chemical to 2,375 barrels of emulsion. After allowing the water to separate a sample of the supernatant oil was found to be free of bottom settlings.

Example V

The acetate salt of the same aminated chlorinated paraffin used in Example IV (which contained 6.0% nitrogen and 5.8% chlorine) was used to treat a water-in-oil emulsion known to contain 30% bottom settlings and 20% water. At a ratio of eight pounds of the chemical to 2,375 barrels of emulsion a clean oil was obtained which was free of bottom settlings.

Example VI

An aminated chlorinated paraffin, containing 4.91% nitrogen and 14.8% chlorine was employed as the oil-treating agent in a plant scale test on an emulsion which contained before treatment 15% bottom settlings and no free water. The aminated chlorinated paraffin was introduced at the wellhead by means of a lubricator. The mixture of a petroleum emulsion and treating agent was then passed through a heater which raised the temperature to 130° F. and then was passed into a settling tank. Samples of oil were taken at 24-hour intervals, both before and after the heater. Composite samples of the oil, both before and after the heater, showed no sign of bottom settlings at a ratio of one gallon of chemical to 2,000 barrels of clean oil. The treatment was also carried out at atmospheric temperature and there was no observable difference in the efficiency of treating with this agent.

The aminated chlorinated paraffins effective as demulsification agents in accordance with this invention are prepared by chlorinating a paraffin wax or other suitable hydrocarbons in any well-known manner to a chlorine content of about 15% to about 50% and then subjecting the chlorinated paraffin to amination with ammonia to replace part of the chlorine by amino groups. The amination reaction may be carried out in the presence of a solvent, if desired, such as methanol, ethanol, etc. The aminated chlorinated paraffin is characterized by having a chlorine content of about 2% to about 20%, preferably about 6% to about 12,% and a nitrogen content of about 1% to about 11%, preferably about 4% to about 7%.

The paraffin wax or other hydrocarbon which may be chlorinated and subsequently aminated to produce the aminated chlorinated paraffins may be paraffin, petrolatum, Barnsdall wax, petroleum jelly, parowax, and paraffin wax or any petroleum fraction containing from about 18 to 30 carbon atoms and preferably from about 22 to about 28 carbon atoms.

The aminated chlorinated paraffins may be used in the form of the free amine or as the salt of the amine such as the chloride, acetate, sulfate, or any other low molecular weight acid. The salts of higher molecular weight acids such as the resinate or the oleate are of value in some instances but the salts of low molecular weight acids have a wider application and are, therefore, usually preferable. However, the free amines are operable and frequently are preferable to the amine salt. The free amines, in general, are more efficient and are easier to handle in the field. They are much lower in viscosity than the amine salt and, therefore, are more adaptable to handling in conventional proportioning pumps such as are used in the oil fields.

The aminated chlorinated paraffins may be employed by any of the well-known methods in use for breaking petroleum emulsions. They may be introduced into the well in which the emulsion is produced, introduced into the conduit through which the emulsion is flowing, introduced into the tank where the emulsion is stored, or introduced into a container containing sludge which has been drawn off from the bottom of an oil storage tank. After treatment, the emulsion is allowed to stand, usually in a settling tank, at a temperature varying from 200° F. to atmospheric temperature in order to allow the oil and water or brine to separate.

In the process of breaking petroleum emulsions by treatment with an aminated chlorinated paraffin, dilutions of from 1 to 200 or 1 to 100,000 or greater, depending upon the difficulty of breaking the emulsion, may be used.

The aminated chlorinated paraffins have marked advantages for resolving petroleum emulsions in many oil fields over the demulsifiers now in use in those fields. A clean oil is produced at a much lower ratio of chemical to oil and at at a lower temperature than is possible for other treating agents. Frequently the petroleum emulsion must be heated with the demulsifier in order to break the emulsion whereas with the aminated chlorinated paraffins such heat-treatment is usually not necessary. The aminated chlorinated paraffins give a rapid and clean-cut water break, an oil being produced which is clean and practically free from bottom settlings.

Throughout the specification and claims the term "aminated chlorinated paraffin" is understood to include the free amine and salts thereof.

What I claim as new and desire to protect by Letters Patent is:

1. A process for breaking petroleum emulsions of the water-in-oil type, which comprises subjecting the emulsion to the action of an aminated chlorinated paraffin which is characterized by a nitrogen content of about 1% to about 11% and a chlorine content of about 2% to about 20%.

2. A process for breaking petroleum emulsions of the water-in-oil type, which comprises subjecting the emulsion to the action of an aminated chlorinated paraffin which is characterized by a nitrogen content of about 4% to about 7% and a chlorine content of about 6% to about 12%.

3. A process for breaking petroleum emulsions of the water-in-oil type, which comprises subjecting the emulsion to the action of the acetate of an aminated chlorinated paraffin which is characterized by a nitrogen content of about 4% to about 7% and a chlorine content of about 6% to about 12%.

4. A process for breaking petroleum emulsions of the water-in-oil type, which comprises subjecting the emulsion to the action of the hydrochloride of an aminated chlorinated paraffin which is characterized by a nitrogen content of about 4% to about 7% and a chlorine content of about 6% to about 12%.

PAUL G. CARPENTER.

REFERENCES CITED

The following references are of record in the file of this patent:

UNITED STATES PATENTS

| Number | Name | Date |
|---|---|---|
| 2,246,842 | De Groote | June 24, 1941 |
| 2,305,830 | Profft | Dec. 22, 1942 |
| 2,361,457 | Clark | Oct. 31, 1944 |